C. NYSTROM.
GRASS TRIMMER.
APPLICATION FILED APR. 16, 1914.
1,108,611.
Patented Aug. 25, 1914.
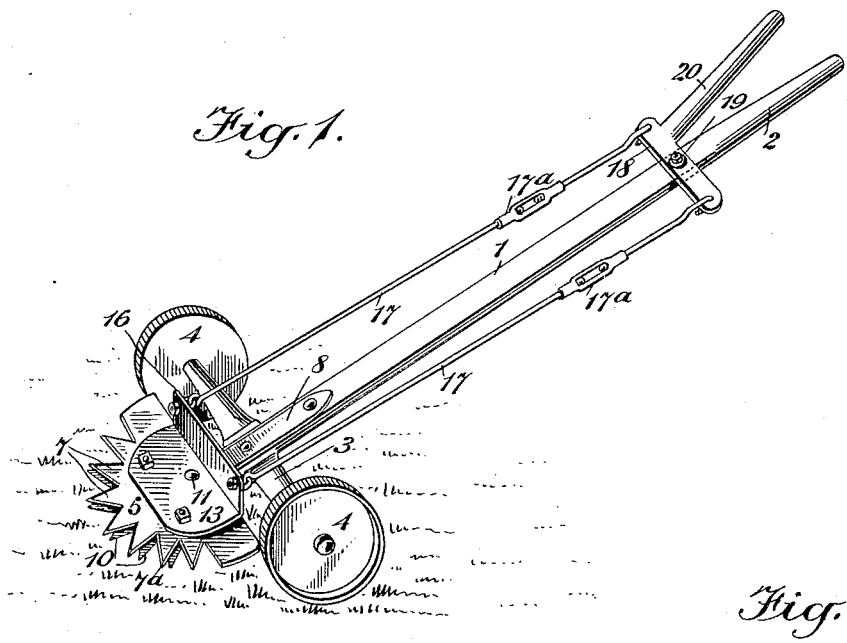
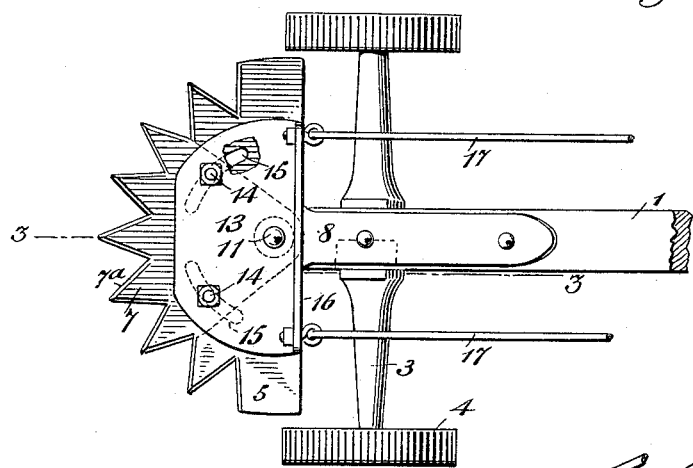
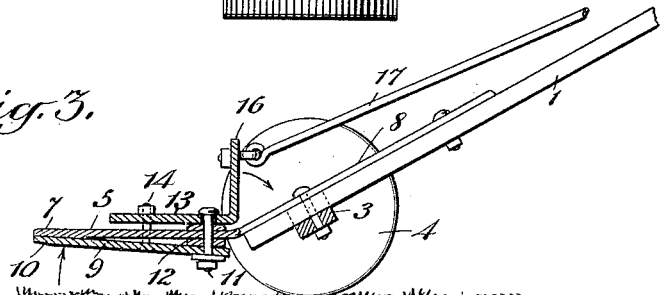
WITNESSES
INVENTOR
Charles Nystrom
BY
ATTORNEYS

UNITED STATES PATENT OFFICE.

CHARLES NYSTROM, OF NEW YORK, N. Y.

GRASS-TRIMMER.

1,108,611.

Specification of Letters Patent. Patented Aug. 25, 1914.

Application filed April 16, 1914. Serial No. 832,198.

*To all whom it may concern:*

Be it known that I, CHARLES NYSTROM, a citizen of the United States, and a resident of the city of New York, Westchester, borough of the Bronx, in the county of Bronx and State of New York, have invented a new and useful Improvement in Grass-Trimmers, of which the following is a full, clear, and exact description.

This invention relates to grass cutters for lawn use and deals more particularly with trimmers to be used in places where lawn mowers are not serviceable.

The general objects of the invention are to improve and simplify the construction of apparatus of the character referred to, so as to be reliable and efficient in use, of durable and substantial design, and easy to operate.

More specifically the objects of the invention are to provide an improved arrangement of relatively reciprocating cutters whereby the cutting edges will be maintained in contact so that the grass will be effectively cut without liability of the cutters becoming choked, the operating mechanism for the movable cutter or blade including means whereby the blades are maintained in cutting contact.

With such objects in view, and others, as will appear as the description proceeds, the invention comprises the various novel features of construction and arrangement of parts which will be more fully described hereinafter and pointed out in the appended claims, reference being had to the accompanying drawing wherein similar reference characters are used to designate corresponding parts in the several views and wherein Figure 1 is a perspective view of the grass trimmer, Fig. 2 is a plan view thereof, with the handle portion broken away, Fig. 3 is a vertical section on line 3—3, Fig. 2.

Referring to the drawing 1 designates the handle bar, which at one end is formed into a grip or handle 2 and at the other end is fastened to an axle 3 that is provided with wheels 4. Fastened to the axle end of the handle bar is a stationary cutter or blade 5 that has a semi-circular series of cutting teeth 7 provided with beveled knife edges 7ª. This blade 5 has a rearwardly extending tongue 8 which is bolted to the handle bar, although any other suitable means may be provided to secure the blade in place.

The movable cutter or blade 9 is placed under the fixed blade and has a semi-circular set of teeth 10 which co-act with the teeth 7 as the blade 9 moves back and forth. The two blades are connected by a pivot or bolt 11 arranged at the center of curvature of the sets of cutting teeth 7 and 10. Interposed between the blades and held on the pivot 11 is a washer 12 whereby the blades are held spaced from each other at all points except the teeth, which are maintained in contact by means of the blade operating mechanism, whereby the most effective shearing or cutting action is obtained.

The actuating mechanism includes an oscillating plate 13 disposed above the fixed blade and secured in place by and oscillating about the pivot bolt 11. The plate 13 and movable blade 9 are connected by bolts 14 spaced radially from the pivot 11 and passing through slot 15 in the fixed blade concentric with the pivot. The plate 13 has a rear upstanding flange 16 and at the ends thereof are connected actuating rods 17 that extend along opposite sides of the handle bar and are connected with an operating lever 18 pivoted at 19 on the handle bar. This lever is provided with a handle 20 disposed adjacent the handle 2 so that the lever can be operated by one hand while the trimmer is guided by the other hand. The rods 17 include turn-buckles 17ª whereby the required tension can be placed on the element 13 to maintain the cutting teeth of the movable blade in contacts with the teeth of the fixed blade.

As viewed from the side, the oscillatory element 13 may be considered as a bell crank lever, having one arm connected with the movable cutting blade to pull the same upwardly against the fixed blade and the other arm connected with the actuating rods 17, it being noted that the pivotal connection of the oscillatory element being such that it can pivot to a limited extent on a horizontal axis in addition to having an oscillatory movement in a horizontal plane.

From the foregoing description, taken in connection with the accompanying drawing, the advantages of the construction and method of operation will be readily understood by those skilled in the art to which the invention appertains, and while I have described the principle of operation of the invention and the apparatus which I now consider to be the best embodiment thereof, I desire to have it understood that the apparatus shown, is merely an illustration, and that such changes may be made when desired as are within the scope of the appended claims.

What I claim as new and desire to secure by Letters Patent, is:

1. A grass trimmer comprising a wheeled supporting structure including a handle, a fixed toothed element, a movable blade under the element and having cutting teeth, an oscillatory plate disposed over the element and having an upstanding flange, means connecting the plate and movable blade together and both oscillating about a single axis, operating rods connected with the flange of the said plate and including tensioning devices, and a hand lever mounted on the handle bar and connected with the rods to simultaneously push one and pull the other for oscillating the movable blade.

2. A grass trimmer comprising a movable supporting structure, a fixed blade thereon, a movable blade disposed under the fixed blade, an oscillatory element mounted over the fixed blade and having two members, a connection between one member and the movable blade for oscillating the latter, said connection passing through the fixed blade, and a pair of actuating rods connected with the other member for oscillating the said element and movable blade, said actuating rods including means for exerting a tension on the said element in a direction to maintain the movable blade against the fixed blade.

3. A grass trimmer comprising a movable supporting structure including a handle, a fixed blade thereon, a movable blade associated with and disposed under the fixed blade, an oscillatory element disposed over the fixed blade and connected with the movable blade whereby the element and movable blade oscillate in a plane parallel with the fixed blade, an upstanding member on the said element, rods connected with the upstanding member at opposite sides of the center of oscillation of the element, and an actuator connected with the rods for causing movement thereof simultaneously in opposite directions, each rod including means for exerting a tension on the said element to maintain the movable blade in contact with the fixed blade.

4. A grass trimmer comprising a movable supporting structure including a handle, a fixed blade thereon, a movable blade disposed under the fixed blade, a movable element disposed over the fixed blade, connecting means between the element and movable blade, a member rigidly connected with the element and extending at an angle to the plane in which the element moves, and means for exerting a tension on the member, whereby the element exerts an upward pull on the movable blade to maintain the same in contact with the fixed blade.

In testimony whereof I have signed my name to this specification in the presence of two subscribing witnesses.

CHARLES NYSTROM.

Witnesses:
C. BRADWAY,
PHILIP D. ROLLHAUS.

---

Copies of this patent may be obtained for five cents each, by addressing the "Commissioner of Patents, Washington, D. C."